United States Patent [19]

Ducker, III et al.

[11] Patent Number: 5,405,221
[45] Date of Patent: * Apr. 11, 1995

[54] GYRO-STABILIZED TOOL BIT WITH WIDE, REMOVABLE MOUNTING ADAPTOR FOR USE IN A WIDE MOUTH CHUCK

[76] Inventors: Andrew L. Ducker, III, 9604 NW. 28th St., Coral Springs, Fla. 33065; Andrew L. Ducker, Jr., Rte. 6 Box 686, Mooreseville, N.C. 28115

[*] Notice: The portion of the term of this patent subsequent to Jul. 12, 2011 has been disclaimed.

[21] Appl. No.: 237,380

[22] Filed: May 3, 1994

Related U.S. Application Data

[63] Continuation-in-part of Ser. No. 55,984, Apr. 29, 1993, Pat. No. 5,328,308, which is a continuation-in-part of Ser. No. 998,389, Dec. 30, 1992, abandoned.

[51] Int. Cl.⁶ .................. B23B 51/00; B23B 51/12
[52] U.S. Cl. ........................ 408/226; 279/83; 407/30; 408/239 A; 451/541
[58] Field of Search ............. 81/54, 438, 439; 51/206 R; 279/83, 129, 905; 407/30, 53, 54, 120; 408/199, 226, 239 A, 241 R

[56] References Cited

U.S. PATENT DOCUMENTS

| | | | |
|---|---|---|---|
| 2,718,806 | 9/1955 | Clark | 81/438 |
| 2,809,529 | 10/1957 | Ondeck | 81/54 |
| 3,734,516 | 5/1973 | Smith | 279/75 |
| 3,735,993 | 5/1973 | Seibert | 279/905 |
| 3,945,653 | 3/1976 | Falchle | 279/97 |
| 4,483,108 | 11/1984 | Howard | 51/206 R |
| 4,536,108 | 8/1985 | Saxton et al. | 408/226 |
| 4,692,073 | 9/1987 | Martindell | 408/239 |
| 4,811,843 | 3/1989 | Stribiak | 408/241 R |
| 4,818,157 | 4/1989 | Kouvelis | 408/240 |
| 4,900,202 | 2/1990 | Weinheld | 408/240 |
| 5,062,749 | 11/1991 | Sheets | 408/240 |
| 5,102,271 | 4/1992 | Hemmings | 408/226 |
| 5,116,172 | 5/1992 | Koster | 408/226 |
| 5,328,308 | 7/1994 | Ducker, III et al. | 408/226 |

FOREIGN PATENT DOCUMENTS

| | | | |
|---|---|---|---|
| 20498 | of 1898 | United Kingdom | 408/226 |
| 2031764 | 4/1980 | United Kingdom | 408/239 A |

*Primary Examiner*—Steven C. Bishop
*Attorney, Agent, or Firm*—Frank L. Kubler

[57] ABSTRACT

A tool bit includes a shaft portion having an adaptor end and a working end and a middle segment connecting the adaptor end and the working end, the middle segment having an average radius and a longitudinal axis, an adaptor base having an axial bore for receiving the adaptor end and having a fastening structure for removably securing the adaptor end within the axial bore, where the adaptor base has an average radius which is at least two times the average radius of the shaft portion middle segment, for enhanced tool bit stability, and where the adaptor base includes a lateral chuck engaging surface adapted to abut during rotational loading of the tool bit a corresponding lateral adaptor base engaging surface within a power tool chuck, and to abut the adaptor base engaging surface at a distance from the shaft portion longitudinal axis of at least two times the average radius of the middle segment so that the chuck engaging surface lockingly abuts the adaptor base engaging surface with a substantial moment, to resist adaptor base stripping and slipping, and to further enhance tool bit rotational stability. The chuck engaging surface preferably includes a substantially planar lateral face and the adaptor base engaging surface within the chuck also preferably includes a substantially planar lateral face.

20 Claims, 6 Drawing Sheets

GYRO-STABILIZED TOOL BIT WITH WIDE, REMOVABLE MOUNTING ADAPTOR FOR USE IN A WIDE MOUTH CHUCK

This application is a continuation-in-part of application Ser. No. 08/055,984, filed on Apr. 29, 1993, issuing as U.S. Pat. No. 5,328,308 on Jul. 12, 1994, which is a continuation-in-part of application Ser. No. 07/998,389, filed on Dec. 30, 1992, now abandoned.

BACKGROUND OF THE INVENTION

1. Field of the Invention

The present invention relates generally to the field of tool bits and tool bit chucks, and more specifically to a tool bit including an elongate shaft having a shaft diameter and an adaptor end and a working end, the adaptor end being removably secured within an axial shaft receiving bore of an adaptor member, the adaptor member having a width of at least twice the shaft diameter for increased tool bit stability and being removably connected to the elongate shaft with set screws extending laterally through the adaptor member and into the shaft bore to abut the shaft. The apparatus optionally includes a separate axial bore containing a row of loosely fitting stabilizing balls, stabilizing cylinders, or cooling fluid, and optionally includes a flywheel portion extending radially from the shaft, the flywheel portion preferably being a hexagonal cylinder or disk. The working end takes any of several useful shapes, such as a drill cutting edge, a screw driver head, a reamer or a socket engaging end.

2. Description of the Prior Art

There have long been tool bits and chucks for fast, snap-in and snap-out engagement. A problem with these bits and chucks has been that the snap-in engagement, often by cammed balls, is not as tight as a clamping key chuck engagement, and the bit often vibrates and wobbles. Other problems have included chuck bulk, complexity, unreliability, and manufacturing expense.

Wienhold, U.S. Pat. No. 4,900,202, issued on Feb. 13, 1990, discloses a snap-in tool bit and a chuck assembly for the tool bit, intended to prevent undesired tool bit extraction from the chuck. The tool bit itself includes a shank portion with a circumferential engagement groove. The chuck includes a spindle having an axial bore for receiving the shank portion of the tool bit, and radial ports opening into the shank receiving bore which contain detent balls. The balls are cammed radially inward to partially enter the engagement groove by a cam shoulder projection within a spring-biased locking sleeve. The wall of each port are curved inward at their inner ends to retain the balls. All illustrated variations of the shoulder projection have at least one additional step or ramp for bearing against the balls and stopping them from rolling within the curved ports. A problem with the Wienhold tool bit is that the ball engagement does not provide the tight clamping of a key chuck, and no provision is made to compensate for this loss of stability. A problem with the Wienhold chuck is that the curved ball ports must have substantial depth. If they do not, the additional step or ramp for jamming the ball against rotation could cause the balls to roll out of their ports. To make the ports deep, the spindle must be made thick and needlessly heavy and costly in materials. The additional step also raises manufacturing costs.

Sheets, U.S. Pat. No. 5,062,749, issued Nov. 5, 1991, teaches a tool bit and tool coupler similar to that of Wienhold. The Sheets tool bit differs from that of Wienhold in that a radial flange on a shank must be provided for proper interaction with the Sheets chuck, adding expense, while only negligibly increasing radial mass distribution and stability. The Sheets chuck differs from Wienhold in that the cam shoulder portion is narrower and no additional cam step is provided. A problem with the Sheets chuck is that the narrowness of the shoulder portion enhances the potential for unwanted release from accidentally nudging the sleeve. Sheets also differs from Wienhold in that two or more balls may be contained within each port rather than one. Having additional balls in a port merely makes it necessary for the port to be deeper and the spindle thicker and heavier. The two springs and the two diameter axial bore make Sheets complex and expensive. Another problem with the Sheets chuck is that the sleeve must be pushed away from the user for release of the tool bit. Pushing on part of an appliance while holding the appliance is more awkward and difficult than pulling on the part.

Martindell, U.S. Pat. No. 4,692,073, issued on Sep. 8, 1987, teaches another circumferentially grooved tool bit and cammed ball tool chuck with an outer spring-biased sleeve. Rather than positioning a flat cam shoulder over a ball to lock the ball in the tool bit groove, a taper is provided which merely biases the ball radially inward. A problem with Martindell is that the tool bit groove is also tapered or curved. Pulling axially on the tool bit could thus cause the tapered groove to cam the ball back out of the groove and force the sleeve into an unlocked position. In this way, if a tool bit becomes caught during use, pulling on the chuck could unlock the sleeve and leave the tool bit stuck in the work piece. Another problem with the Martindell chuck is that, like the Sheets chuck, the sleeve must be awkwardly pushed away from the user for release tool bit release.

Falchle, U.S. Pat. No. 3,945,653, issued on Mar. 23, 1976, discloses a chuck for securing a tool bit having a shank with a circumferential groove. The chuck includes a spindle having an axial bore for receiving the tool bit shank. The spindle also has a slot on one side into which a cylindrical locking element is laterally positioned. The slot angles through a wall of the spindle, and a sleeve slidingly fits around the spindle, containing a retaining compartment for holding the ends of the locking element. Sliding the sleeve axially relative to the spindle in one direction causes the sleeve retaining compartment to pull the locking element radially outward along the angled slot. When the element is in an outward position, the tool bit shank is free to slide into and out of the axial bore. Moving the sleeve in the opposite axial direction pushes the element radially inward along the angled slot and, if a tool bit shank is in the bore, into the groove to lock the bit in the chuck. A problem with Falchle is that the spindle must be thick and heavy to contain a slot within which the cylindrical element can thus slide. Also, no provision is made to add stability to the tool bit.

Kouvelis, U.S. Pat. No. 4,818,157, issued on Apr. 4, 1989, teaches a quick-change adaptor and tool bit for use with the adaptor. The tool bit has a multi-sided shank portion with a circumferential groove, for fitting into a tubular portion of the adaptor. The adaptor has a shaft portion for fitting into the chuck of a powered rotary tool coaxially attached to the tubular portion. A spring-loaded detent ball is contained within a radial port in the wall of the tubular portion, so that when a tool bit shank portion is fitted into the tubular portion, the ball snaps into the groove to secure the tool bit. A problem with Kouvelis is that the detent ball is biased rather than locked into the groove, and the resulting tool bit engagement is thus unreliable. Another problem is that Kouvelis does not disclose a chuck for permanent installation on a power tool, but merely a small adaptor for use in an existing chuck. Finally, Kouvelis does not compensate for the potential loss in tool bit stability between the chuck and the adaptor and between the adaptor and the tool bit.

Smith, U.S. Pat. No. 3,734,516, issued on May 22, 1973, teaches a chuck assembly for a tool bit adaptor. As in Kouvelis, a tool bit fits into the adaptor and the adaptor fits into a power tool chuck. A problem with Smith is that the chuck is a multi-spring, complicated assembly which would be expensive to manufacture and likely subject to failure. Another problem is once again that stability is lost at multiple couplings and there is no structure to compensate for this loss.

Ondeck, U.S. Pat. No. 2,809,529, issued on Oct. 15, 1957, discloses a screw driver attachment including a tool shank joined at its mounting end to a disk member. The disk member is contained within a housing, and a roller bears against the disk member. A problem with Ondeck if used as a drill tool bit is that there is no mounting end opposite the shank end which could fit into a chuck.

Seibert, U.S. Pat. No. 3,735,993, issued on May 29, 1973, teaches a self-release and reload tooling device. The device includes an adaptor having a threaded bore for receiving a tool shank and having a threaded external surface for receiving an adaptor nut. A problem with Seibert is that the tool bit is screwed into the bore in the adaptor, so that there is limited stiffness between the adaptor and the tool shank, minimizing stability.

Koster, U.S. Pat. No. 5,116,172, issued on May 26, 1992, discloses a composite rotary cutting tool and adaptor, and a method of making them. A problem with Koster is that the tool shank is secured into the adaptor with an adhesive. Since an adhesive can deform and compress, it offers limited shank stiffness and stability.

Hemmings, U.S. Pat. No. 5,102,271, issued on Apr. 7, 1992 and Stribiak, U.S. Pat. No. 4,811,843, issued on Mar. 14, 1989, both teach collet drill bits having depth limiting rings. A problem with both devices is that the rings or gripping collars are apparently of the conventional type described in Stribiak, which are slidably fitted onto the tool shank and are of lighter and softer material than the shank. A light material such as plastic cannot serve as an effective flywheel and the sliding fit does not produce the solid, unified structure important to stability.

Saxton, U.S. Pat. No. 4,536,108, issued on Aug. 20, 1985, discloses a flexible micro-drill bit. Saxton includes a standard, circular mounting end and a reduced-diameter midsection leading to a narrow drill shank for fine work. A problem with Saxton is that it fails to teach a flywheel portion larger than the conventional chuck receiving opening. As a result, any stabilizing effect of the larger mounting end, particularly with a standard size shank, is both very minimal and accidental.

Clark, U.S. Pat. No. 2,718,806, issued on Sep. 27, 1955, reveals a magnetic driving tool having a multi-sided shank and a socket-receiving end structure. Sockets snap over a spring-loaded ball at the outer end of the receiving end structure and against an expanded stop portion. A problem with Clark is that the mounting end of the shank is apparently of conventional chuck opening diameter and thus provides no increased stability.

Schroer, No. 20,498, dated Sep. 28, 1898, appears to teach a reamer having a mounting end of smaller diameter than the tool shank itself. This size relationship actually leads to a reduction in stability. An expanded portion is provided, but is only negligibly larger than the tool shank, and thus would have a negligible effect on stability. The expanded portion is apparently intended as a stop rather than as a stabilizer.

It is thus an object of the present invention to provide a tool bit with a removable, wide adaptor base with a connecting end having a lateral chuck engaging surface which permits fast coupling and uncoupling of the tool bit and adaptor base in a chuck and ready removal and replacement of a worn or broken tool bit from the adaptor base for economical reuse of the adaptor base.

It is another object of the present invention to provide such a tool bit where the wide adaptor base stabilizes the tool bit for smooth operation with minimal vibration.

It is still another object of the present invention to provide such a tool bit which, because of the gyroscopic, flywheel stability of the wide adaptor base, overcomes the major stability problems associated with previous quick-change bits for keyless chucks.

It is finally an object of the present invention to provide such a tool bit and adaptor base which is durable, reliable and relatively inexpensive to manufacture.

SUMMARY OF THE INVENTION

The present invention accomplishes the above-stated objectives, as well as others, as may be determined by a fair reading and interpretation of the entire specification.

A tool bit is provided including a shaft portion having an adaptor end and a working end and a middle segment connecting the adaptor end and the working end, the middle segment having an average radius and a longitudinal axis, an adaptor base having an axial bore for receiving the adaptor end and having a fastening structure for removably securing the adaptor end within the axial bore, where the adaptor base has an average radius which is at least two times the average radius of the shaft portion middle segment, for enhanced tool bit stability, and where the adaptor base includes a lateral chuck engaging surface adapted to abut during rotational loading of the tool bit a corresponding lateral adaptor base engaging surface within a power tool chuck, and to abut the adaptor base engaging surface at a distance from the shaft portion longitudinal axis of at least two times the average radius of the middle segment so that the chuck engaging surface lockingly abuts the adaptor base engaging surface with a substantial moment, to resist adaptor base stripping and slipping, and to further enhance tool bit rotational stability. The chuck engaging surface preferably includes a substantially planar lateral face and the adaptor base engaging surface within the chuck also preferably includes a substantially planar lateral face.

The adaptor base preferably includes a circumferential outer surface and a threaded set screw bore extending from the outer surface into the axial bore, and where the fastening structure preferably includes a set screw screwed into the threaded set screw bore to abut and engage the adaptor end. The adaptor base includes a circumferential outer surface and two non-parallel threaded set screw bores extending from the outer surface into the axial bore, and where the fastening structure preferably includes a set screw screwed into each threaded set screw bore to abut and engage the adaptor end.

The adaptor base preferably includes a stabilizing ball bore coaxial with the longitudinal axis of the shaft portion, at least one stabilizing ball contained within the stabilizing ball bore, the at least one stabilizing ball having a diameter less than that of the stabilizing ball bore to permit relative movement between the at least one stabilizing ball and the mounting end, a retaining structure for preventing escape of the at least one stabilizing ball from the stabilizing ball bore.

The adaptor base preferably additionally includes a shaft receiving end containing the axial bore and a connecting end for insertion into a chuck, and a flywheel portion extending radially outward from the shaft receiving end for rotationally stabilizing the tool bit.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
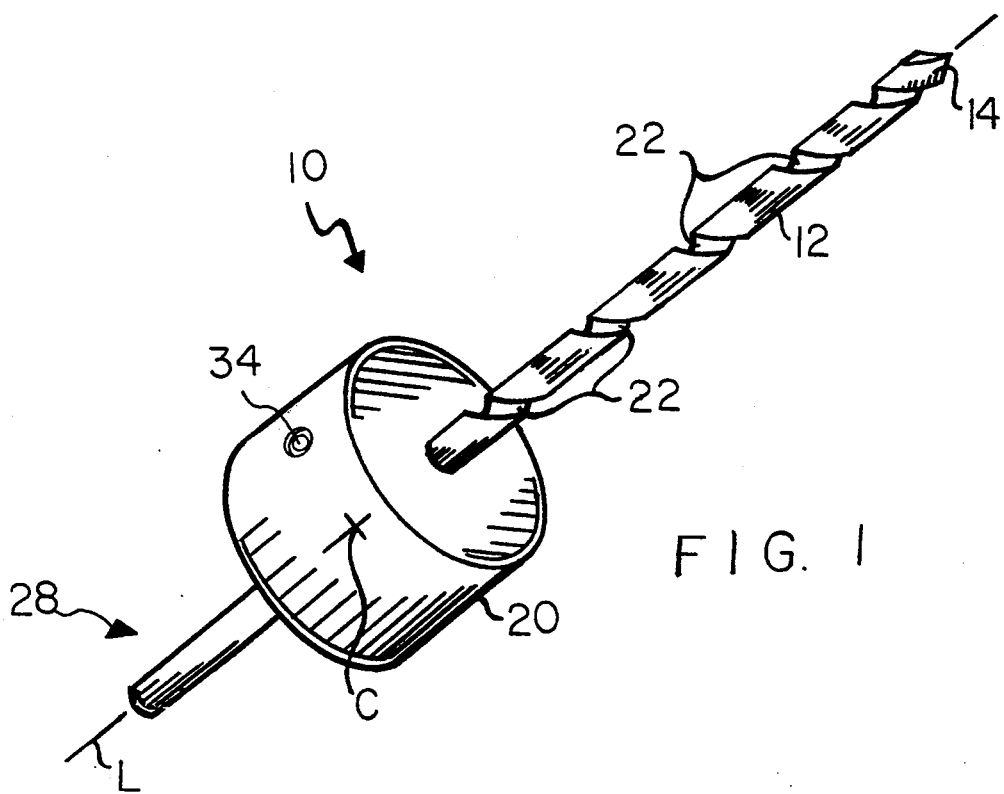
FIG. 1 is a perspective view of one embodiment of the inventive tool bit, having the flywheel stabilizing feature and a spiral drill working end.
Figure 2:
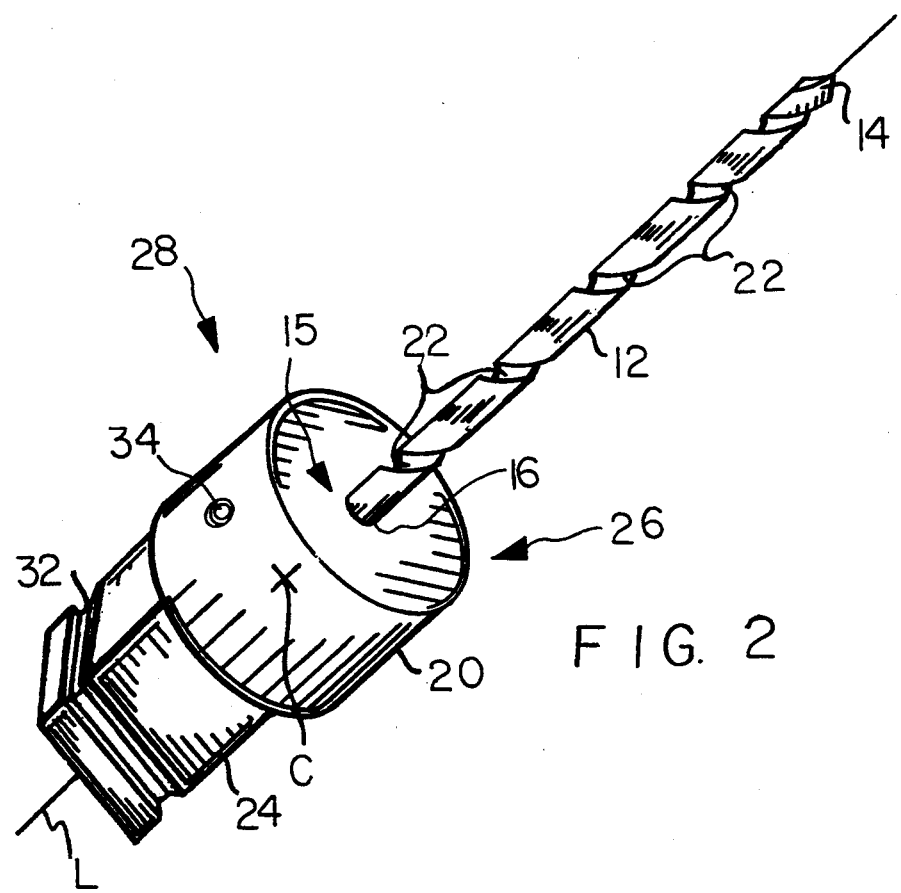
FIG. 2 is a perspective view of the inventive tool bit as in FIG. 1, with the addition of the wide mounting base and locking groove.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 3:
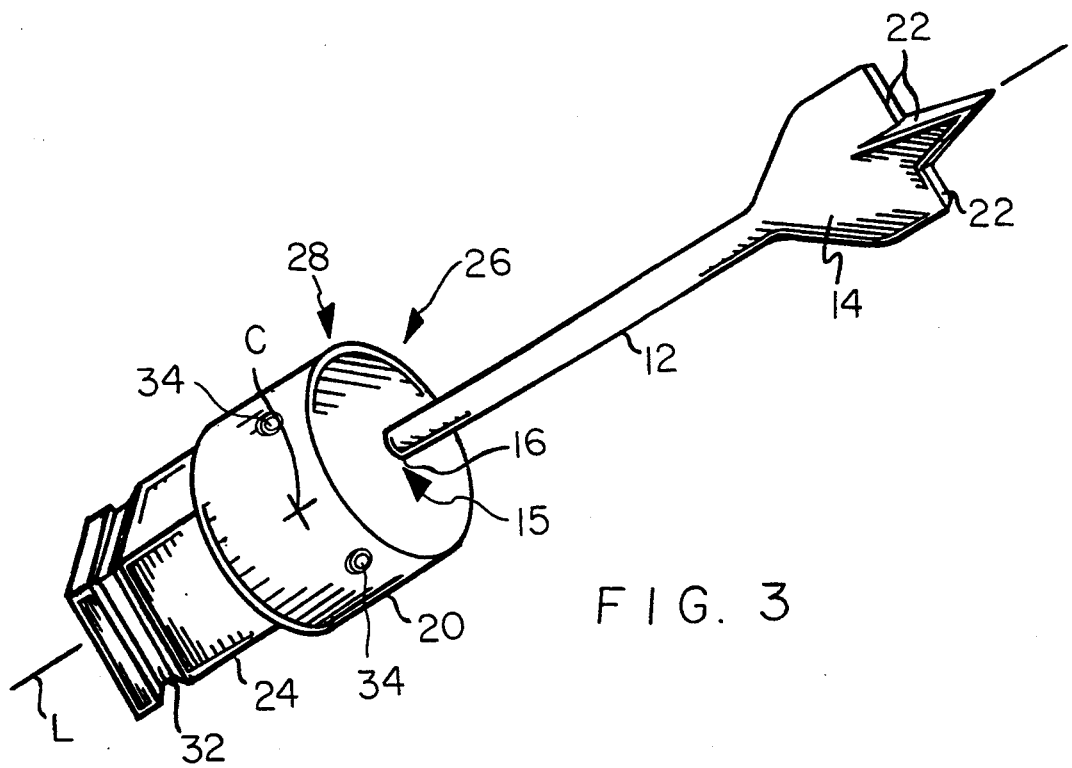
FIG. 3 is a perspective view of the inventive tool bit as in FIG. 2, except that the working end forms a flat edge wood drill working end.
Figure 4:
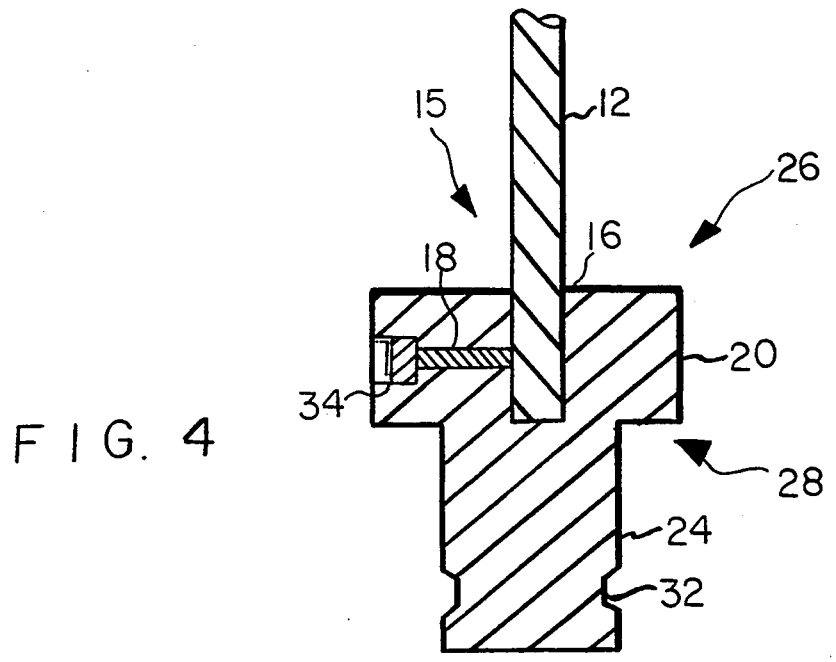
FIG. 4 is a cross-sectional side view of the tool bit of FIGS. 2 and 3, revealing one of the set screws holding the tool bit shank in the adaptor base axial bore.
Figure 10:
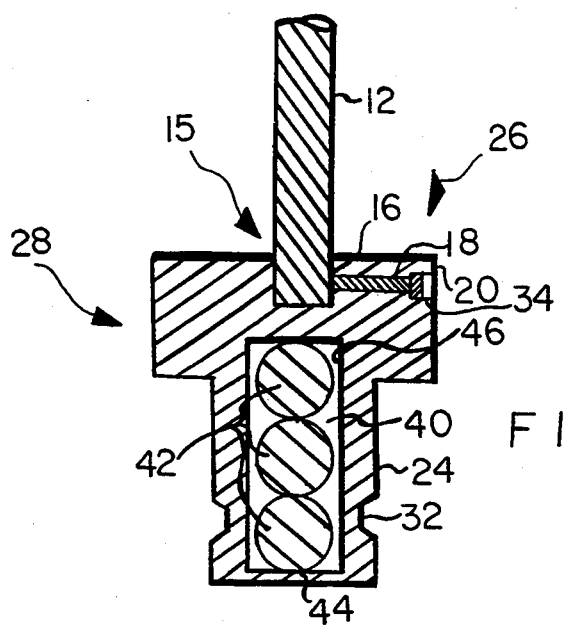
FIG. 10 is a cross-sectional side view of the tool bit of FIG. 8, and having the preferred interior stabilizing ball feature, illustrating three stabilizing balls contained within the mounting end axial bore.
Figure 11:
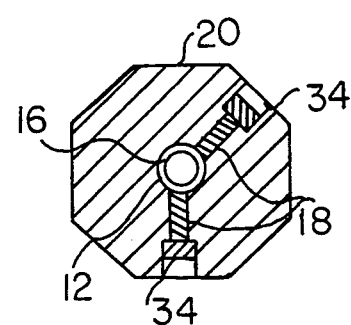
FIG. 11 is a cross-sectional top view of the inventive mounting base revealing the two set screws extending into the adaptor base axial bore.

Referring to FIGS. 1 through 8 and to FIG. 10, a gyroscopically stabilized tool bit 10 is disclosed. Tool bit 10 includes an elongate shaft 12 having a working end 14 and an adaptor end 15. Adaptor end 15 fits into an axial bore 16 in a wide adaptor base 24. Adaptor base 24 is a substantially solid member having a bit receiving end 26 surrounded by a flywheel portion 20 extending radially outward, and having a chuck connecting end 28. A set screw 34 extends laterally into a radial threaded set screw bore 18 near receiving end 26. Two set screws 34 are preferably provided at receiving end 26, passing through flywheel portion 20 and are countersunk so that their heads are recessed into the lateral faces of flywheel portion 20. Set screws 34 preferably have Allen wrench heads. Set screws 34 are preferably positioned within threaded set screw bores 18 which are preferably either ninety degrees apart from each other, or where flywheel portion 20 has a hexagonal shaped perimeter, which are preferably one hundred twenty degrees apart to fit perpendicularly into flywheel portion 20 side faces. See FIGS. 2 and 11. These two set screws 34 together secure tool bit 10 against vibration and movement in all lateral directions. Flywheel portion 20 includes a heavy material, preferably a metal. See FIG. 4. Working end 14 may include a drill cutting edge 22 of any conventional type, such as the spiral cutting edge 22 of FIGS. 1 and 2. FIG. 3 shows tool bit 10 with a flat drill cutting edge 22. Working end 14 may alternatively include a reamer or an abrading surface, a screwdriver head or socket head. See FIGS. 5-7.

Figure 5:
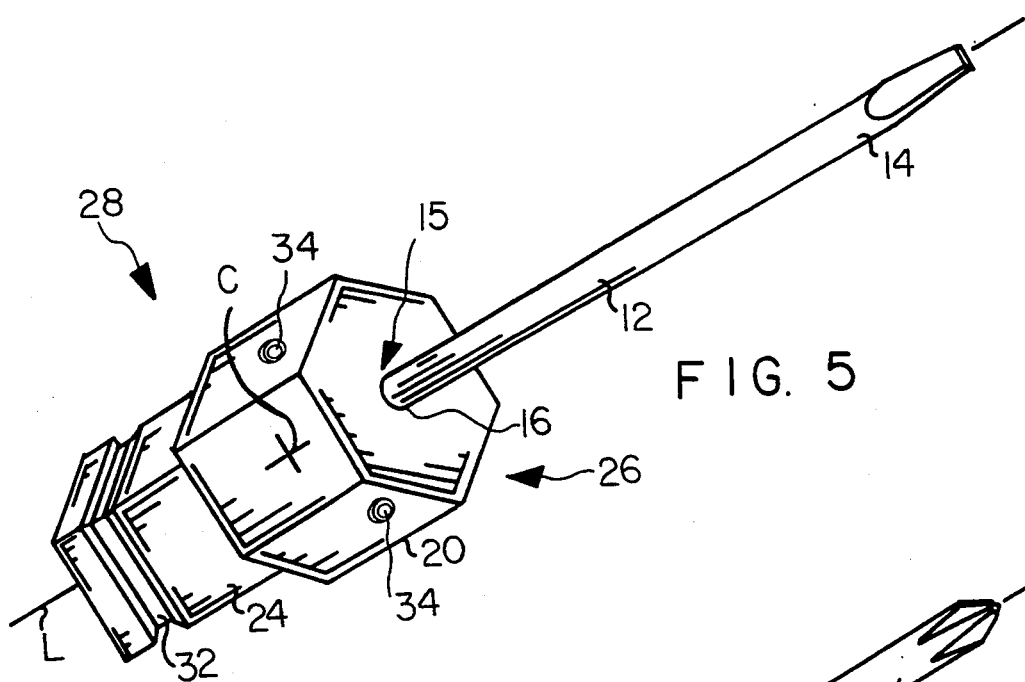
FIG. 5 is a perspective view of the inventive tool bit as in FIG. 2, except that the preferred hexagonal flywheel, and a flat head screw driver working end are provided.
Figure 6:
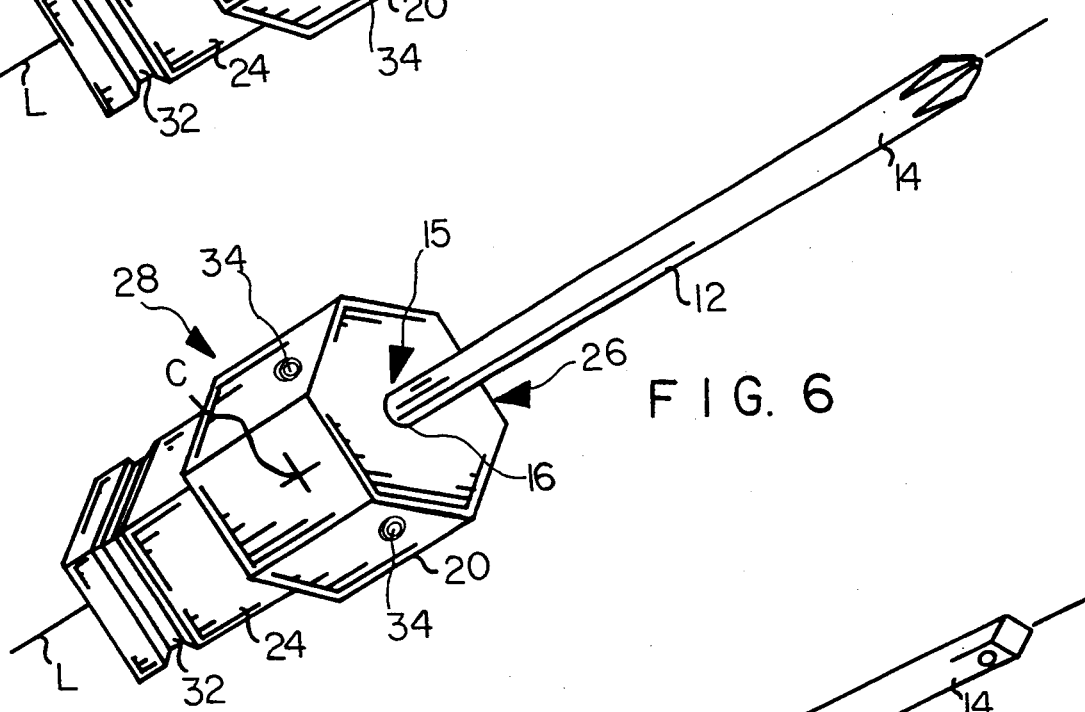
FIG. 6 is a view as in FIG. 5, except that the working end is a cross-shaped, pointed tip screw driver head, commonly known as a PHILLIPS TM screw driver head.
Figure 7:
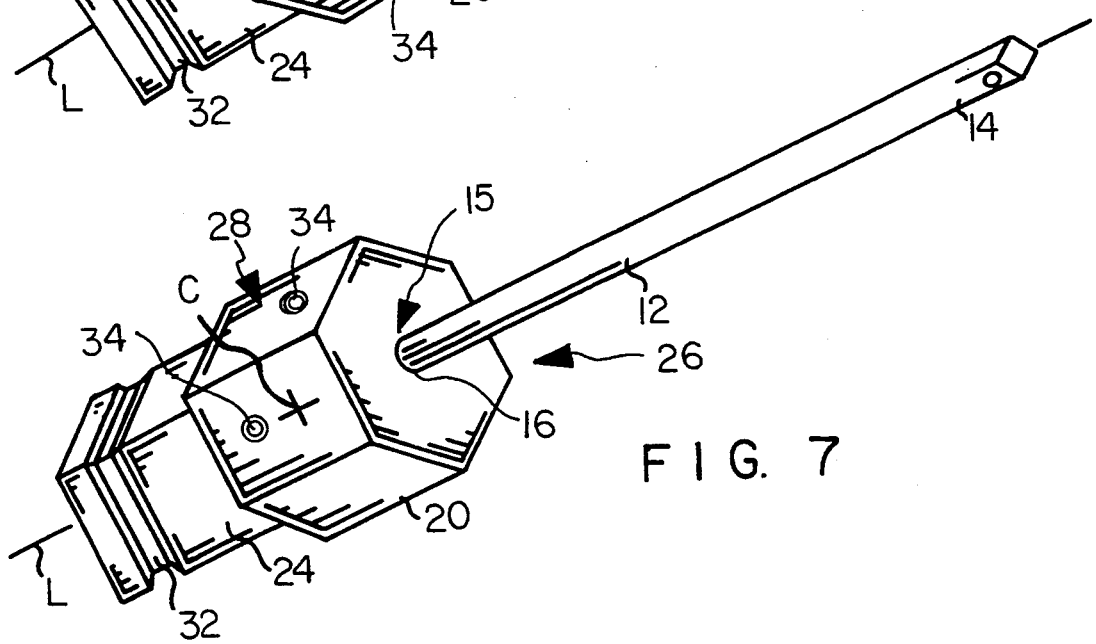
FIG. 7 is a view as in FIG. 6, except that the working end is a square, socket receiving end.
Figure 8:
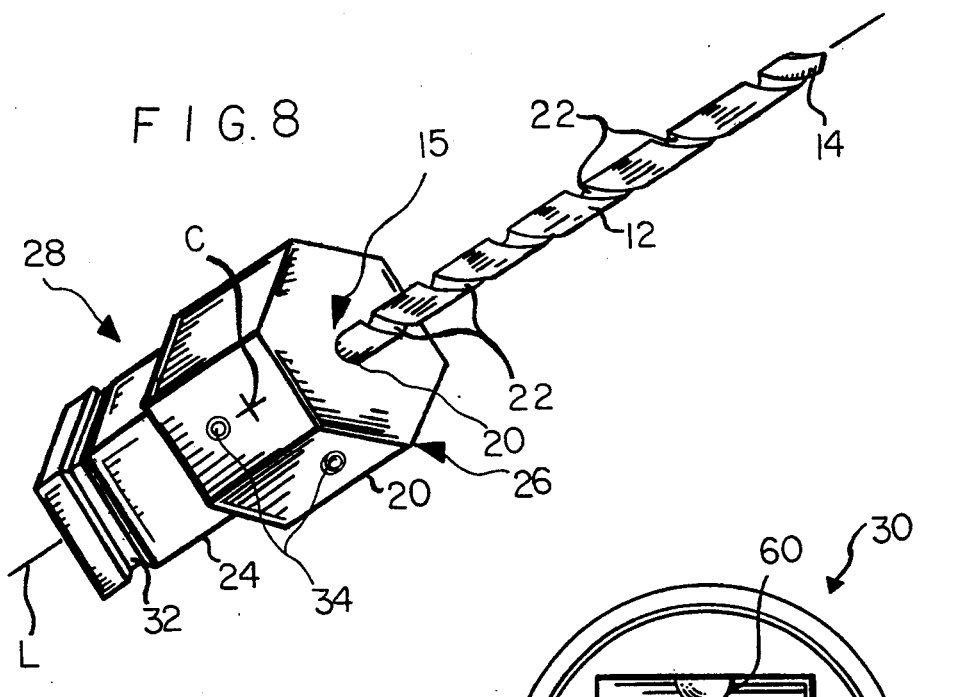
FIG. 8 is a view as in FIG. 7, except that the working end forms a spiral drill.

Flywheel portion 20 may be cylindrical or disk shaped, but may take any shape as long as the center of mass C of flywheel portion 20 is located on the longitudinal axis L of shaft 12. The first preferred flywheel portion 20 shape, however, is hexagonal, as shown in FIG. 5. This hexagonal shape for flywheel portion 20 is also the design used for most of the tested prototypes.

Flywheel portion 20 stabilizes bit 10 because it significantly increases the rotational inertia of bit 10, and thus increases its angular momentum. The law of conservation of angular momentum holds that the angular momentum of an object is unchanged unless an external force acts on the object. A force can act on the rotating object to change its angular momentum not only by changing its angular speed, but also by changing its axis of rotation. The resistance offered by the object to the force is directly proportional to the magnitude of the angular momentum of the object. The angular speed taken together with the angle of rotation define a vector quantity known as angular velocity.

The increased resistance to changes in angular speed is beneficial where the density of a work piece varies throughout the drilling. The angular momentum of drill bit 10 carries it steadily through the high density areas with minimal binding.

The increased resistance to changes in the axis of rotation is beneficial because it increases rotational stability and minimizes vibration. It also permits more accurate drilling at a marked point on a work piece, particularly where the point has not been indented with a center punch or similar tool. The reduced need for center-punching can reduce project working time and costs.

The greater the angular momentum of an object, the greater the force required to shift the axis of rotation by a given angle. Thus, if a tool bit is mounted in a chuck with a slight tilt, or is otherwise disposed to wobble or to be laterally deflected by the work piece, the increased angular momentum created by flywheel portion 20 minimizes or eliminates the deflection or wobble.

The increase in rotational inertia, and thus in angular momentum, of drill bit 10 is brought about not only by the added mass of flywheel portion 20, but also by the particular distribution of the mass about axis L. The farther a given mass is distributed from the axis of rotation, the greater the rotational inertia created by that mass. For a disk or cylinder, rotational inertia I is a function of the mass M and the radial distance R of the mass from the rotational axis: $I = \frac{1}{2}MR^2$. Thus, an increase in the radial distance R exponentially increases the rotational inertia I. It is for this reason that the rotational inertia, and thus the stability, of a conventional drill bit is small for its mass: the mass is all located very close to the axis of rotation. By the same token, as shown, the addition of the wider, flywheel portion 20 increases angular momentum exponentially. It is believed that the rotational inertia of flywheel portion 20 should be at least half the rotational inertia of shaft 12 to achieve a significant stabilizing effect.

Figure 9:
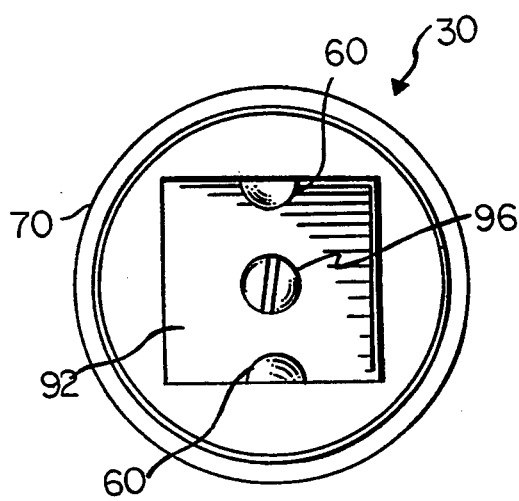
FIG. 9 is an end view of the inventive, wide mouth tool bit mounting chuck, showing the wide, square receiving tube, inwardly projecting locking balls, and the mounting screw.

To further increase tool bit stability, the adapter base 24 forms a wide chuck mounting end 28, see FIGS. 2 through 8, and preferably fits into a correspondingly wide chuck 30 opening. See FIG. 9. In this instance, end 28 preferably has a square cross-section and has a groove 32 which slides into the chuck 30 opening and receives cammed locking balls. The square cross-section assures that the end 28 will not slip in the chuck 30 opening. This is important because mounting end 28 slipping can be the first step toward shaft 12 breakage. The cammed ball engagement type of tool bit is known in the art, and is illustrated in U.S. Pat. No. 5,062,749, issued to Sheets on Nov. 5, 1991, and in U.S. Pat. No. 4,900,202, issued to Wienhold on Feb. 13, 1990. However, for the present invention, end 28 is preferably wide in proportion to the diameter of shaft 12, unlike the apparatus of Sheets. The large surface area of end 28 resulting from the increased width helps make the bit 10 engagement more solid.

Wide chuck mounting end 28 adds stability to tool bit 10 in at least two ways. First, the wide radial distribution of its mass permits mounting end 28 to itself act as a flywheel. In this way, mounting end 28 adds stability according to the above-recited physical principles.

Second, and no less important, is the geometric benefit of having the cammed locking balls engage groove 32 at a significant distance beyond the radius of shaft 12. Although it is preferred that tool bit 10 and chuck 30 be manufactured with reasonably close tolerances, a certain amount of play between groove 32 and the cammed locking balls may be present. This play may result from limitations of the tolerances themselves or from prolonged use and wear, or simply from heavy stresses created by certain work applications. This play would permit groove 32 to move a certain axial distance D with respect to the adjacent portions of chuck 30. The closer this axial distance D is to the axis L of rotation of tool bit 10, the greater will be the angle over which axis L resultingly tilts. By making mounting end 28 substantially wider than shaft 12, the angle over which axis L tilts when groove 32 moves distance D is significantly reduced. Limiting the potential tilting angle of axis L of tool bit 10 goes to the very essence of adding stability to tool bit 10. The radially distant grip of chuck 30 on mounting end 28 also provides the mechanical advantage of increased leverage. The width of mounting end 28 and the corresponding chuck 30 opening increases in stages as shank 12 diameters increase. It is preferred that mounting end 28 have a given width for shanks 12 having diameters of one-sixteenth up to one-quarter inch. Mounting end 28 preferably has a greater given width for shanks 12 having diameters of one-quarter up to three-eights inch, and a still greater given width for shanks 12 having diameters of three-eights to one-half inch. These two characteristics overcome the instability problems of previous snap-in, quick change and keyless chuck bits. The result is that this inventive tool bit 10 design is believed to be the first truly practical quick change design.

Second Preferred Embodiment

Figure 10A:
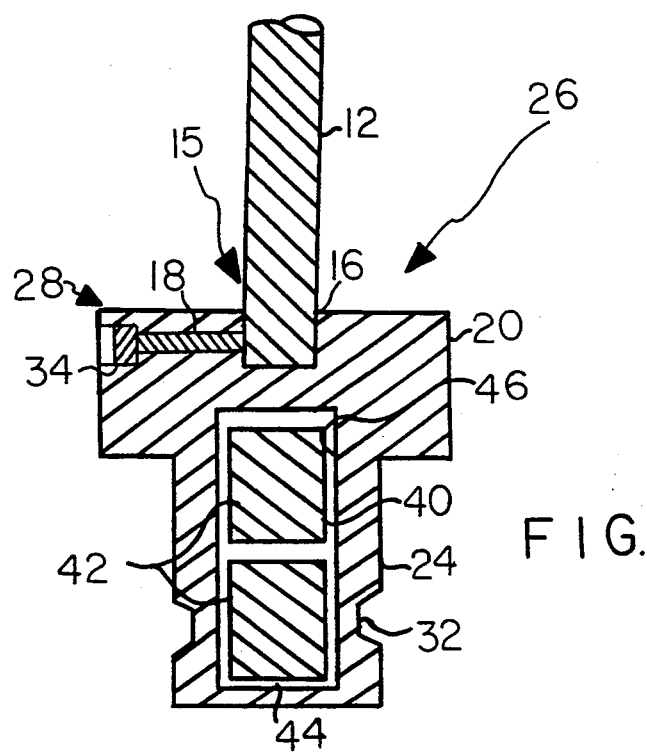
FIG. 10a is a cross-sectional side view as in FIG. 10, showing an equivalent stabilizing cylinder option.

Prototype testing has shown that stability is further increased by not only having a wide engaging end 28, but also by including an axial, circular bore 40 in end 28 and providing stabilizing balls 42 within bore 40. See FIG. 10. Cylinders 42 may be equivalently substituted for balls 42. See FIG. 10a. Bore 40 is closed at the tip of end 28 with a layer of weld material forming an end wall 44. It is preferred that balls 42 have a diameter just slightly smaller than that of bore 40, so that they roll freely within bore 40. Balls 42 ride on one side of the cylindrical, inner wall 46 of bore 40, and resist movement of wall 46 against balls 42, because this would shift the axis of their rotation. Should end 28 wobble in the opposite direction, the close tolerance between wall 46 and balls 42 causes balls 42 to quickly make contact with wall 46 and resist further lateral movement.

Prototype testing has shown that a bore 40 which displaces a volume of bit 10 material having a mass equal to about half of the mass of end 28, gives satisfactory performance. Balls 42 having a combined mass equal to half the mass of the displaced bit 10 material have also proven satisfactory. Three balls 42 have worked well. See FIG. 10. These prototype characteristics are merely exemplary, and should not be construed as limiting.

Figure 12:
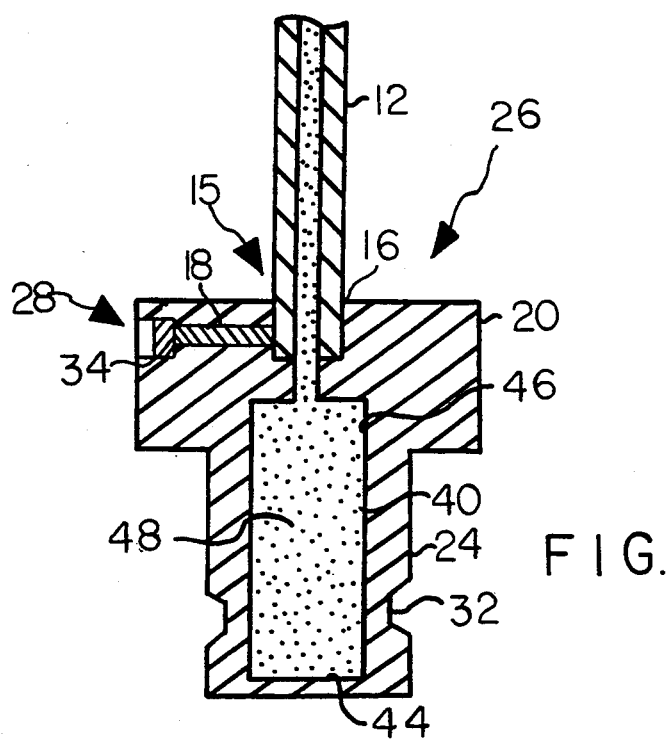
FIG. 12 is a cross-sectional side view as in FIG. 10, illustrating the internal fluid option.
Figure 13:
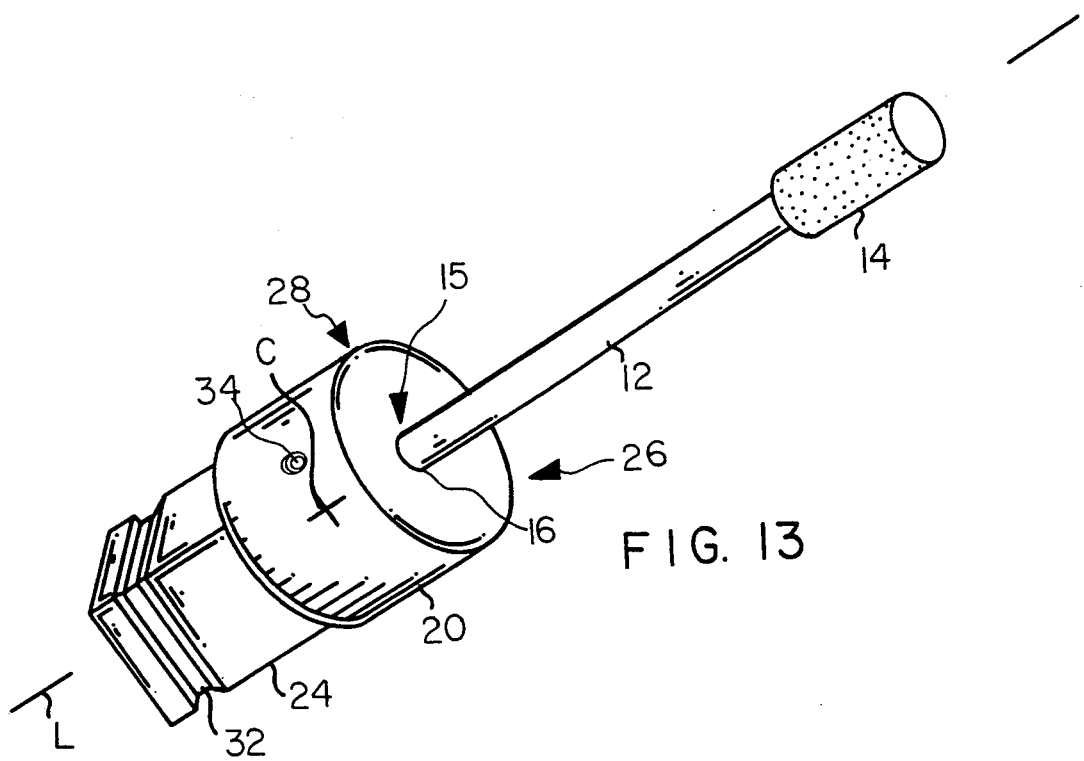
FIG. 13 is a perspective view of the inventive tool bit as in FIG. 2, except that the working end forms a circular cylinder having a circumferential abrading surface.
Figure 14:
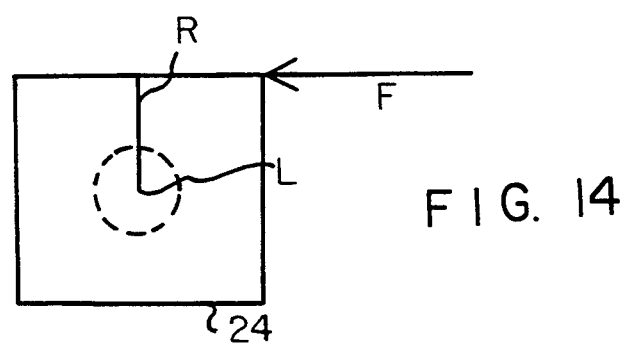
FIG. 14 is a bottom end view of a tool bit wide mounting end showing the increased radius "r" acted upon by the force "F" imparted by the chuck opening inner faces during a rotational loading of said tool bit. The relative diameter of the shank or shaft middle portion is shown in broken lines.

Another stability increasing variation of tool bit 10 includes bore 40 of the previous embodiment. Shaft 12 also may include a bore along its axis as a continuation of bore 40. Bore 40 is filled with a fluid 48, preferably a liquid lubricant, and sealed closed. See FIG. 12. Fluid 48 can have two functions. The first function is to draw heat away from the metal exterior of shaft 12. For this purpose, a fluid 48 substance is selected to have a high heat storage capacity, which is a characteristic related to the specific heat of the fluid. It is believed that some solid and gaseous substances are also capable of performing this heat absorbing function. Prototype testing has shown that an internal fluid 48 also functions to increase rotational stability, as do the internal balls 42 discussed above.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A tool bit comprising:
   a shaft portion having an adaptor end and a working end and a middle segment connecting said adaptor end and said working end, said middle segment having an average radius and a longitudinal axis,
   an adaptor base having a first axial bore for receiving said adaptor end and having fastening means for removably securing said adaptor end within said first axial bore,
   wherein said adaptor base has an average radius which is at least two times said average radius of said shaft portion middle segment, for enhanced tool bit stability,
   and wherein said adaptor base comprises a lateral chuck engaging surface adapted to abut during rotational loading of said tool bit a corresponding lateral adaptor base engaging surface within a power tool chuck, and to abut said adaptor base engaging surface at a distance from said shaft portion longitudinal axis of at least two times said average radius of said middle segment such that said chuck engaging surface lockingly abuts said adaptor base engaging surface with a substantial moment, to resist adaptor base stripping and slipping, and to further enhance tool bit rotational stability.

2. The tool bit of claim 1, wherein said chuck engaging surface comprises a substantially planar lateral face and said adaptor base engaging surface within said chuck also comprises a substantially planar lateral face.

3. The tool bit of claim 1, wherein said adaptor base comprises a circumferential outer surface and a threaded set screw bore extending from said outer surface into said axial bore, and wherein said fastening means comprises a set screw screwed into said threaded set screw bore to abut and engage said adaptor end.

4. The tool bit of claim 1, wherein said adaptor base comprises a circumferential outer surface and two non-parallel threaded set screw bores extending from said outer surface into said first axial bore, and wherein said fastening means comprises a set screw screwed into each said threaded set screw bore to abut and engage said adaptor end.

5. A tool bit according to claim 1, wherein said adaptor end comprises:
   a stabilizing ball bore coaxial with said longitudinal axis of said shaft portion,
   at least one stabilizing ball contained within said stabilizing ball bore, said at least one stabilizing ball having a diameter less than that of said stabilizing ball bore to permit relative movement between said at least one stabilizing ball and said mounting end,
   retaining means for preventing escape of said at least one stabilizing ball from said stabilizing ball bore.

6. The apparatus of claim 1, wherein said adaptor base additionally comprises a shaft receiving end containing said axial bore and a connecting end for insertion into a chuck, and a flywheel portion extending radially outward from said shaft receiving end for rotationally stabilizing said tool bit.

7. A tool bit comprising:
   a shaft portion having an adaptor end and a working end and a middle segment connecting said adaptor end and said working end, said middle segment having an average radius and a longitudinal axis,
   an adaptor base having an axial bore for receiving said adaptor end and having fastening means for removably securing said adaptor end within said axial bore,
   wherein said adaptor base has an average radius which is at least three times said average radius of said shaft portion middle segment, for enhanced tool bit stability,
   and wherein said adaptor base comprises a lateral chuck engaging surface adapted to abut during rotational loading of said tool bit a corresponding lateral adaptor base engaging surface within a power tool chuck, and to abut said adaptor base engaging surface at a distance from said shaft portion longitudinal axis of at least three times said average radius of said middle segment such that said chuck engaging surface lockingly abuts said adaptor base engaging surface with a substantial moment, to resist adaptor base stripping and slipping, and to further enhance tool bit rotational stability.

8. The tool bit of claim 7, wherein said chuck engaging surface comprises a substantially planar lateral face and said adaptor base engaging surface within said chuck also comprises a substantially planar lateral face.

9. The tool bit of claim 7, wherein said adaptor base comprises a circumferential outer surface and a threaded set screw bore extending from said outer surface into said axial bore, and wherein said fastening means comprises a set screw screwed into said threaded set screw bore to abut and engage said adaptor end.

10. The tool bit of claim 7, wherein said adaptor base comprises a circumferential outer surface and two non-parallel threaded set screw bores extending from said outer surface into said axial bore, and wherein said fastening means comprises a set screw screwed into each said threaded set screw bore to abut and engage said adaptor end.

11. A tool bit according to claim 7, wherein said adaptor end comprises:
   a stabilizing ball bore coaxial with said longitudinal axis of said shaft portion,
   at least one stabilizing ball contained within said stabilizing ball bore, said at least one stabilizing ball having a diameter less than that of said stabilizing ball bore to permit relative movement between said at least one stabilizing ball and said mounting end,
   retaining means for preventing escape of said at least one stabilizing ball from said stabilizing ball bore.

12. The apparatus of claim 7, wherein said adaptor base additionally comprises a shaft receiving end containing said axial bore and a connecting end for insertion into a chuck, and a flywheel portion extending radially outward from said shaft receiving end for rotationally stabilizing said tool bit.

13. A tool bit comprising:
   a shaft portion having an adaptor end and a working end and a middle segment connecting said adaptor end and said working end, said middle segment having an average radius and a longitudinal axis,
   an adaptor base having an axial bore for receiving said adaptor end and having fastening means for removably securing said adaptor end within said axial bore,
   wherein said adaptor base has an average radius which is at least four times said average radius of said shaft portion middle segment, for enhanced tool bit stability,
   and wherein said adaptor base comprises a lateral chuck engaging surface adapted to abut during rotational loading of said tool bit a corresponding lateral adaptor base engaging surface within a power tool chuck, and to abut said adaptor base engaging surface at a distance from said shaft portion longitudinal axis of at least four times said average radius of said middle segment such that said chuck engaging surface lockingly abuts said adaptor base engaging surface with a substantial moment, to resist adaptor base stripping and slipping, and to further enhance tool bit rotational stability.

14. The tool bit of claim 13, wherein said chuck engaging surface comprises a substantially planar lateral face and said adaptor base engaging surface within said chuck also comprises a substantially planar lateral face.

15. The tool bit of claim 13, wherein said adaptor base comprises a circumferential outer surface and a threaded set screw bore extending from said outer surface into said axial bore, and wherein said fastening means comprises a set screw screwed into said threaded set screw bore to abut and engage said adaptor end.

16. The tool bit of claim 13, wherein said adaptor base comprises a circumferential outer surface and two non-parallel threaded set screw bores extending from said outer surface into said axial bore, and wherein said fastening means comprises a set screw screwed into each said threaded set screw bore to abut and engage said adaptor end.

17. A tool bit according to claim 13, wherein said adaptor end comprises:
   a stabilizing ball bore coaxial with said longitudinal axis of said shaft portion,
   at least one stabilizing ball contained within said stabilizing ball bore, said at least one stabilizing ball having a diameter less than that of said stabilizing ball bore to permit relative movement between said at least one stabilizing ball and said mounting end,
   retaining means for preventing escape of said at least one stabilizing ball from said stabilizing ball bore.

18. The apparatus of claim 13, wherein said adaptor base additionally comprises a shaft receiving end containing said axial bore and a connecting end for insertion into a chuck, and a flywheel portion extending radially outward from said shaft receiving end for rotationally stabilizing said tool bit.

19. A tool bit according to claim 1, additionally comprising:
   a substance containing axial bore in said shaft portion separated from said first axial bore by partition means,
   a substance contained within said substance containing axial bore for drawing heat away from the exterior of said shaft portion,
   means for retaining said substance within said substance containing axial bore.

20. A tool bit according to claim 7, additionally comprising:
   a substance containing axial bore in said shaft portion separated from said first axial bore by partition means,
   a substance contained within said substance containing axial bore for drawing heat away from the exterior of said shaft portion,
   means for retaining said substance within said substance containing axial bore.

* * * * *